US010793464B2

(12) United States Patent
Bando

(10) Patent No.: US 10,793,464 B2
(45) Date of Patent: Oct. 6, 2020

(54) GLASS PLATE BEND-BREAKING METHOD AND BEND BREAKING APPARATUS THEREOF

(71) Applicant: BANDO KIKO CO., LTD., Tokushima-shi, Tokushima (JP)

(72) Inventor: Kazuaki Bando, Tokushima (JP)

(73) Assignee: BANDO KIKO CO., LTD., Tokushima-shi, Tokushima (JP)

( * ) Notice: Subject to any disclaimer, the term of this patent is extended or adjusted under 35 U.S.C. 154(b) by 0 days.

(21) Appl. No.: 15/526,811

(22) PCT Filed: Nov. 11, 2015

(86) PCT No.: PCT/JP2015/005620
§ 371 (c)(1),
(2) Date: May 15, 2017

(87) PCT Pub. No.: WO2016/079951
PCT Pub. Date: May 26, 2016

(65) Prior Publication Data
US 2017/0334761 A1  Nov. 23, 2017

(30) Foreign Application Priority Data

Nov. 19, 2014 (JP) ................................. 2014-235114
Jan. 27, 2015 (JP) ................................. 2015-013773

(51) Int. Cl.
*C03B 33/033* (2006.01)
*C03B 33/037* (2006.01)

(52) U.S. Cl.
CPC .......... *C03B 33/033* (2013.01); *C03B 33/037* (2013.01)

(58) Field of Classification Search
CPC ............................. C03B 33/033; C03B 33/037
See application file for complete search history.

(56) References Cited

U.S. PATENT DOCUMENTS 2,259,765 A * 10/1941 Morris .................. C03B 33/033
 225/93
2,559,366 A * 7/1951 Morris .................... C03B 33/04
 225/103

(Continued)

FOREIGN PATENT DOCUMENTS

CN  1484619 A  3/2004
EP  1 415 959 B1  10/2010

(Continued)

OTHER PUBLICATIONS

Extended European Search Report dated Jun. 21, 2018 in European Application No. 15862020.3 (7 pages).

(Continued)

*Primary Examiner* — Sean M Michalski
(74) *Attorney, Agent, or Firm* — Nixon & Vanderhye P.C.

(57) ABSTRACT

A bend-breaking apparatus 1A includes a supporting device 7 for supporting a glass plate 2 planarly on an upper surface thereof; a pair of bend-breaking heads 5 which are moved in an X-axis direction and a Y-axis direction within a horizontal plane with respect to the supporting device 7 by being NC controlled above the supporting device 7; a pair of moving devices 27 for respectively moving the pair of bend-breaking heads 5 in the X-axis direction and the Y-axis direction within the horizontal plane; a transporting device 45 for transporting the glass plate 2; a base 14; and a mount 28 which is provided above the base 14.

7 Claims, 7 Drawing Sheets

(56) References Cited

U.S. PATENT DOCUMENTS

| | | | | |
|---|---|---|---|---|
| 2,948,991 A * | 8/1960 | Walters | C03B 33/023 | 225/103 |
| 3,135,446 A * | 6/1964 | Sargent | B26D 1/205 | 225/100 |
| 3,259,286 A * | 7/1966 | Le Gras | C03B 33/033 | 225/2 |
| 3,275,207 A * | 9/1966 | Preudhomme | C03B 33/072 | 225/2 |
| 3,279,664 A * | 10/1966 | Lynch | B65G 49/068 | 209/703 |
| 3,562,058 A * | 2/1971 | Boyd | H01L 21/3043 | 156/300 |
| 3,587,955 A * | 6/1971 | Gehri | B28D 5/0029 | 225/103 |
| 3,786,937 A | 1/1974 | Faust | | |
| 3,786,973 A * | 1/1974 | Bussman | B28D 5/0029 | 225/2 |
| 4,004,723 A | 1/1977 | Kabanov et al. | | |
| 4,018,372 A * | 4/1977 | Insolio | C03B 33/0235 | 225/2 |
| 4,049,167 A * | 9/1977 | Guissard | C03B 33/027 | 225/103 |
| 4,076,159 A * | 2/1978 | Farragher | C03B 33/033 | 225/3 |
| 4,106,683 A * | 8/1978 | Gulish, Jr. | C03B 33/04 | 225/103 |
| 4,151,940 A * | 5/1979 | Nuding | C03B 33/033 | 225/96.5 |
| 4,285,451 A * | 8/1981 | Ferraino | C03B 33/0235 | 225/2 |
| 4,371,103 A * | 2/1983 | Siemens | C03B 33/04 | 225/1 |
| 4,489,870 A | 12/1984 | Prange et al. | | |
| 4,511,387 A * | 4/1985 | Kellar | C03B 23/0357 | 414/797 |
| 4,685,180 A * | 8/1987 | Kitaya | B24B 9/10 | 29/33 R |
| 4,834,275 A * | 5/1989 | Kittel | C03B 33/033 | 225/96.5 |
| 5,079,876 A * | 1/1992 | Zumstein | B24B 9/10 | 225/93.5 |
| 5,165,585 A * | 11/1992 | Lisec | C03B 33/033 | 225/105 |
| 5,314,523 A * | 5/1994 | Ikola | C03B 33/033 | 225/2 |
| 5,396,736 A * | 3/1995 | Bando | C03B 33/03 | 451/5 |
| 5,413,263 A | 5/1995 | Bando | | |
| 5,458,269 A * | 10/1995 | Loomis | B26F 3/002 | 225/2 |
| 5,785,225 A * | 7/1998 | Loomis | B28D 5/0035 | 225/96.5 |
| 6,461,223 B1 * | 10/2002 | Bando | B24B 9/102 | 451/12 |
| 6,774,978 B2 * | 8/2004 | Shin | C03B 33/07 | 225/96.5 |
| 7,059,938 B2 * | 6/2006 | Bando | B65G 49/064 | 451/12 |
| 7,128,250 B2 | 10/2006 | Luiz | | |
| 7,204,400 B2 * | 4/2007 | Marek | C03B 33/03 | 225/1 |
| 7,439,665 B2 | 10/2008 | Wakayama | | |
| 7,710,533 B2 * | 5/2010 | Mori | C03B 33/033 | 225/2 |
| 8,935,942 B2 * | 1/2015 | Eta | C03B 17/06 | 65/295 |
| 9,399,595 B2 * | 7/2016 | Furuta | C03B 33/0235 | |
| 9,685,579 B2 * | 6/2017 | Gonzalez | H01L 31/18 | |
| 9,771,298 B2 * | 9/2017 | Linnhoff | C03B 33/027 | |
| 9,828,276 B2 * | 11/2017 | Brown | B25B 11/005 | |
| 2004/0060416 A1 | 4/2004 | Luiz | | |
| 2004/0212774 A1 * | 10/2004 | Yamazaki | C03B 33/033 | 349/187 |
| 2006/0081673 A1 * | 4/2006 | Schenk | C03B 33/03 | 225/1 |
| 2006/0128281 A1 * | 6/2006 | Bando | B24B 7/245 | 451/70 |
| 2007/0039990 A1 * | 2/2007 | Kemmerer | B28D 5/0011 | 225/2 |
| 2007/0095108 A1 * | 5/2007 | Kirby | C03B 17/068 | 65/475 |
| 2008/0264994 A1 * | 10/2008 | Herve | C03B 33/0215 | 225/2 |
| 2008/0311817 A1 * | 12/2008 | Kawamoto | C03B 33/023 | 445/24 |
| 2010/0065599 A1 * | 3/2010 | Nishisaka | B28D 1/222 | 225/96.5 |
| 2010/0162758 A1 * | 7/2010 | Lang | B65G 49/064 | 65/29.11 |
| 2011/0095062 A1 * | 4/2011 | Maekawa | C03B 33/033 | 225/2 |
| 2011/0143639 A1 * | 6/2011 | Bando | B65G 49/064 | 451/44 |
| 2011/0277507 A1 * | 11/2011 | Lu | C03B 33/0215 | 65/97 |
| 2014/0239034 A1 * | 8/2014 | Cleary | C03B 33/033 | 225/2 |
| 2018/0037490 A1 * | 2/2018 | Rossmeier | C03B 33/03 | |
| 2018/0044220 A1 * | 2/2018 | Bando | C03B 33/03 | |

FOREIGN PATENT DOCUMENTS

| | | |
|---|---|---|
| JP | 52-104950 U1 | 8/1977 |
| JP | 54-30216 A | 3/1979 |
| JP | 11-171573 A | 6/1999 |
| JP | 2005-325004 | 11/2005 |
| JP | 2009-102204 | 5/2009 |
| JP | 2011-161674 A | 8/2011 |
| JP | 2011-207638 | 10/2011 |
| JP | 2013-028531 | 2/2013 |
| JP | 2013-071866 | 4/2013 |
| JP | 2014-031002 | 2/2014 |
| SU | 528268 | 9/1976 |

OTHER PUBLICATIONS

International Search Report for PCT/JP2015/005620, dated Feb. 16, 2016, 4 pages.
Written Opinion of the ISA for PCT/JP2015/005620, dated Feb. 16, 2016, 3 pages.
Russian Office Action dated Apr. 16, 2018 in Russian Application No. 2017117031 with English "Gist of Russian Office Action," (7 pages).
Chinese Office Action dated Jan. 29, 2019 in Chinese Application No. 201580061557.9, with English translation (19 pages).
Notice of Reasons for Refusal dated Aug. 6, 2019 in Japanese Application No. 2016-137183, with English translation, 4 pages.
Chinese Office Action dated Jan. 22, 2020 in Chinese Application No. 201580061557.9, with English translation, 18 pages.
Brazilian Office Action dated Jan. 28, 2020 in Brazilian Application No. BR112017007527-0, with English Gist of Brazilian Office Action, 6 pages.

* cited by examiner

GLASS PLATE BEND-BREAKING METHOD AND BEND BREAKING APPARATUS THEREOF

This application is the U.S. national phase of International Application No. PCT/JP2015/005620 filed 11 Nov. 2015, which designated the U.S. and claims priority to JP Patent Application No. 2014-235114 filed 19 Nov. 2014 and JP Patent Application No. 2015-013773 filed 27 Jan. 2015, the entire contents of each of which are hereby incorporated by reference.

TECHNICAL FIELD

The present invention relates to a glass plate bend-breaking method after the formation of a cut line in the cutting and manufacturing process of automobile window glass and the like, as well as a bend-breaking apparatus thereof.

The present invention concerns a glass plate bend-breaking method in which a cut line is formed on a glass plate by a cutter wheel and an edge portion between the cut line and a peripheral edge of the glass plate is bend-broken, as well as a bend-breaking apparatus thereof.

The present invention concerns a glass plate bend-breaking method which, after the formation of a cut line in a maximally available size on unworked plate glass, is suitable for bend-breaking and separating a narrow portion, i.e., an edge portion, between the cut line and a peripheral edge of the glass plate, as well as a bend-breaking apparatus thereof.

BACKGROUND ART

Patent Document 1 discloses a method and an apparatus in which a bend-breaking head having a pressing roller is moved along a cut line, and the pressing roller is pressingly and rollingly moved while being oriented along the cut line while being subjected to angular control, to bend-break a corner portion.

Patent Document 2 discloses a method and an apparatus in which a bend-breaking head having a pressing device for thrusting and punching applies thrusts to the edge portion at respective necessary portions while moving round the cut line, to effect bend-breaking and separation.

PRIOR ART DOCUMENTS

Patent Documents

Patent Document 1: JP-A-3-164441
Patent document 2: Japanese Patent No. 2890137

SUMMARY OF THE INVENTION

Problems That the Invention is to Solve

In the processing and production of automobile window glass, the size of unworked glass is made small to lower the production cost, a cut line is formed in a maximally available size on unworked plate glass, and the width (edge width) of the edge portion is made as practically narrow as possible, to thereby attain reduction of the amount of waste cullet.

If the width of the edge portion becomes narrow, in the conventional bend-breaking method and apparatus, it is difficult for its pressing roller and punching device to apply pressing pressure and thrust and punch only to the edge portion.

Accordingly, the present invention has been devised in view of the above-described aspect, and its object is to provide a bend-breaking method and apparatus which are capable of simply and accurately bend-breaking and separating the narrow edge portion.

Means for Solving the Problems

In accordance with the present invention, a glass plate bend-breaking method for bend-breaking and separating an edge portion by causing a pressing roller to partially press the edge portion located between a peripheral edge of the glass plate and a cut line formed on the glass plate, comprises the steps of: causing the pressing roller whose orientation of rolling direction is adjusted to a normal direction to the cut line to rotatingly move at a predetermined bend-breaking position of the edge portion in the normal direction toward the peripheral edge of the glass plate while the edge portion is being pressed by the pressing roller.

In addition, in accordance with the present invention, a glass plate bend-breaking method for bend-breaking and separating an edge portion by causing a pressing roller to partially press the edge portion located between a peripheral edge of the glass plate and a cut line formed on the glass plate, comprises the steps of: causing the pressing roller whose orientation of rolling direction is adjusted to a direction of traversing the edge portion from the cut line toward the peripheral edge of the glass plate to rotatingly move at a predetermined bend-breaking position of the edge portion in the traversing direction while the edge portion is being pressed by the pressing roller.

Further, in accordance with the present invention, a glass plate bend-breaking method for bend-breaking and separating an edge portion by causing a horizontally elongated pressing body to partially press the edge portion located between a peripheral edge of the glass plate and a cut line formed on the glass plate, comprises the steps of: causing the pressing body whose longitudinal direction is adjusted to a direction perpendicular to a direction of traversing the edge portion from the cut line toward the peripheral edge of the glass plate to slidingly move at a predetermined bend-breaking position of the edge portion in the traversing direction while the edge portion is being pressed by the pressing body.

Furthermore, in accordance with the present invention, a glass plate bend-breaking method for bend-breaking and separating an edge portion by causing a pressing body to partially press the edge portion located between a peripheral edge of the glass plate and a cut line formed on the glass plate, comprises the steps of: causing the pressing body to slidingly move at a predetermined bend-breaking position of the edge portion in a direction oriented from the cut line toward the peripheral edge of the glass plate while the edge portion is being pressed by the pressing body.

Still further, in accordance with the present invention, a glass plate bend-breaking method comprises the steps of: causing a pressing body to press an edge portion at a predetermined bend-breaking position of the edge portion located between a peripheral edge of the glass plate and a cut line formed on the glass plate, while causing a supporting body which supports from an opposite direction to a pressing direction of the pressing body the edge portion pressed by the pressing body to move in a direction oriented from the peripheral edge of the glass plate in the edge portion toward the cut line, to thereby bend-break and separate the edge portion.

Furthermore, in accordance with the present invention, a glass plate bend-breaking method comprises the steps of: causing a pressing body to press an edge portion at a predetermined bend-breaking position of the edge portion located between a peripheral edge of the glass plate and a cut line formed on the glass plate, while causing a supporting body which supports from an opposite direction to a pressing direction of the pressing body the edge portion pressed by the pressing body to move beyond the cut line in a direction oriented from the peripheral edge of the glass plate in the edge portion toward the cut line, to thereby bend-break and separate the edge portion.

Still further, in accordance with the present invention, a glass plate bend-breaking method for bend-breaking and separating an edge portion of the glass plate located outside a cut line formed on the glass plate from a main body portion of the glass plate located inside the cut line, comprises the steps of: causing a pressing body to press the glass plate at a predetermined bend-breaking position of the edge portion, while causing a supporting body to support the glass plate from an opposite direction to a pressing direction of the pressing body and moving one of the pressing body and the supporting body in a direction of traversing the edge portion, to thereby bend-break and separate the edge portion from the main body portion.

In accordance with the present invention, a glass plate bend-breaking apparatus comprises: a pressing body for pressing a glass plate with a cut line formed thereon; a supporting body for supporting the glass plate from an opposite direction to a pressing direction of the pressing body; and a moving device for moving one of the pressing body and the supporting body in a direction of traversing an edge portion of the glass plate located outside the cut line, said glass plate bend-breaking apparatus being adapted to bend-break and separate the edge portion from a main body portion of the glass plate located inside the cut line by the movement of one of the pressing body and the supporting body by the moving device.

In the present invention, the pressing body may be a pressing roller such as the one described above, or may be, in substitution for the pressing roller, a pressing rod or a pressing member which do not rotate.

Advantages of the Invention

In accordance with the present invention, since the pressing body or the supporting body is moved relative to the glass plate in the edge portion, it is possible to simply and reliably apply a pressing force even to a narrow edge portion, with the result that it is possible to provide a bend-breaking method and apparatus which are capable of reliably bend-breaking and separating the narrow edge portion.

In addition, in accordance with the present invention, since the orientation of rotating direction of the pressing roller is adjusted to the normal direction to the cut line or the traversing direction oriented toward the peripheral edge of the glass plate in the edge portion, a line of contact between the pressing roller and the glass plate becomes substantially parallel to the cut line, so that only the edge portion can be pressed by the pressing roller, and therefore pressing pressure can be applied simply and reliably even to the narrow edge portion. Hence, it is possible to provide a bend-breaking method and apparatus which are capable of reliably bend-breaking and separating the narrow edge portion.

MODE FOR CARRYING OUT THE INVENTION

Figure 1:
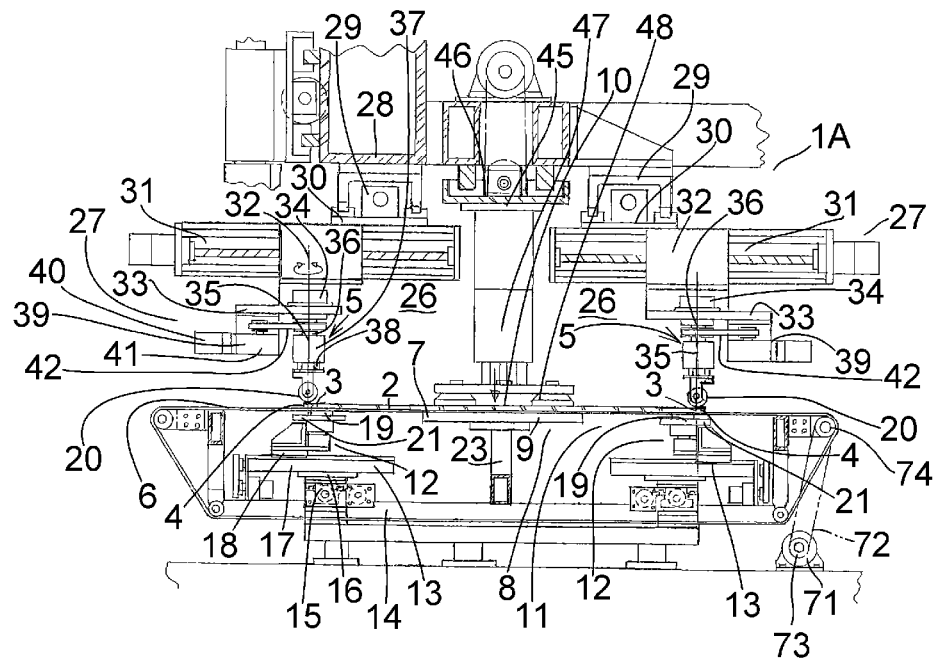
FIG. 1 is an explanatory view of a preferred embodiment of the present invention.
Figure 2:
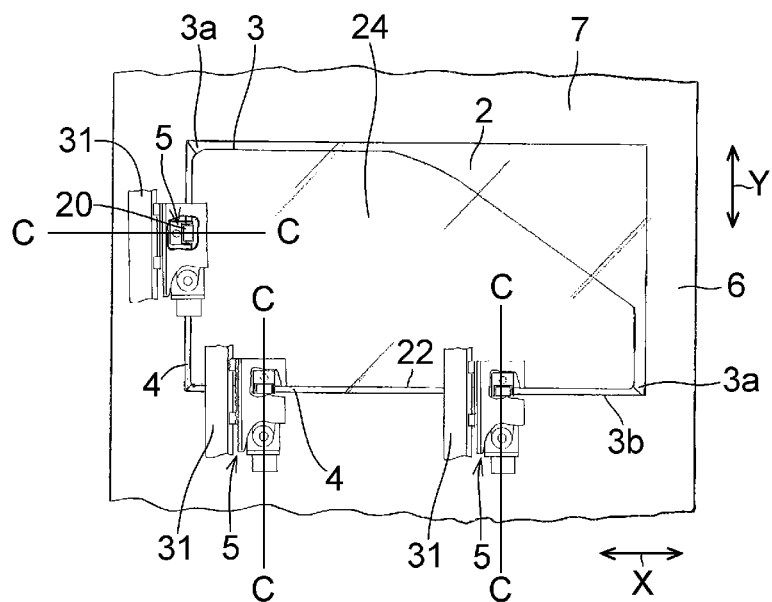
FIG. 2 is an explanatory plan view illustrating the abutting direction and posture of a bend-breaking head with respect to unworked plate glass and a cut line.
Figure 3:
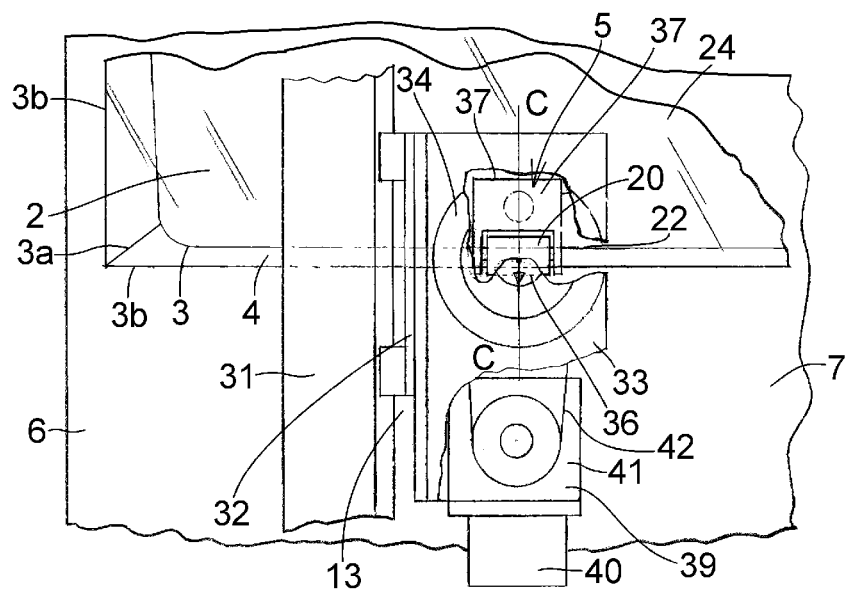
FIG. 3 is an explanatory enlarged view of the abutting direction and posture of the bend-breaking head shown in FIG. 2.
Figure 4:
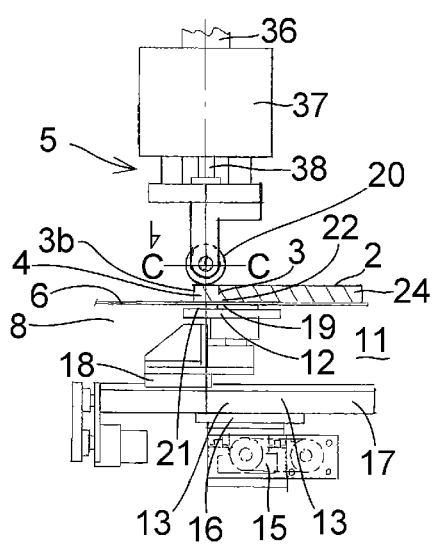
FIG. 4 is an explanatory view of the bend-breaking operation in the embodiment shown in FIG. 1.
Figure 5:
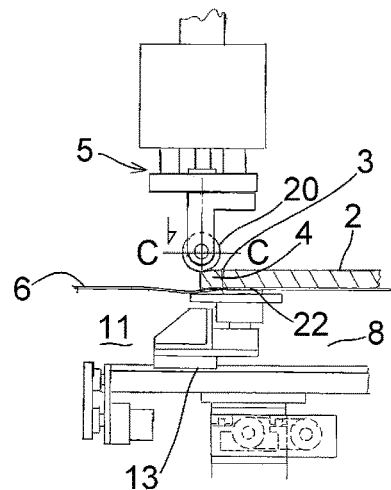
FIG. 5 is an explanatory view of the bend-breaking operation in the embodiment shown in FIG. 1.

Hereafter, a description will be given of the preferred embodiments of the present invention with reference to the drawings. It should be noted that the invention is not limited to these embodiments.

Embodiments

As shown in FIGS. 1 to 5, a bend-breaking apparatus 1A is comprised of a supporting device 7 for supporting a glass plate 2 planarly on an upper surface thereof; a pair of bend-breaking heads 5 which are moved in an X-axis direction and a Y-axis direction within a horizontal plane with respect to the supporting device 7 by being NC controlled above the supporting device 7; a pair of moving devices 27 for respectively moving the pair of bend-breaking heads 5 in the X-axis direction and the Y-axis direction within the horizontal plane; a transporting device 45 for transporting the glass plate 2; a base 14; and a mount 28 which is provided above the base 14.

In a state in which the glass plate 2 having an edge portion 4 located outside a cut line 3 formed in advance on an upper surface thereof and a main body portion 24 located inside the cut line 3 is supported on an upper surface of the supporting device 7, the bend-breaking apparatus 1A is adapted to sequentially perform the bend-breaking and separation of edge portions 4 of the glass plate 2 by moving the respective bend-breaking heads 5 to predetermined bend-breaking positions of the edge portions 4 of the glass plate 2 under NC control.

In addition to cut lines 3, end cut lines 3a are formed in advance on the upper surface of the glass plate 2 at necessary portions, mostly at corner portions of the glass plate 2.

The supporting device 7 has a flexible endless belt 6 for placing the glass plate 2 on an upper surface thereof and a supporting table mechanism 8 provided below the endless belt 6.

The supporting table mechanism 8 includes a fixed central supporting table 9 mounted on a supporting column 23 provided uprightly on the base 14 so as to support the main body portion 24 at a central region 10 through the endless belt 6, a pair of horizontally movable partially supporting tables 12 for partially supporting the glass plate 2 through the endless belt 6, and a pair of moving devices 13 provided in an outer region 11 around the central supporting table 9 so as to respectively move the pair of partially supporting tables 12 horizontally in the outer region 11 under NC control.

Each of the moving devices 13 comprises an X-axis moving mechanism 15 mounted on the base 14 and a Y-axis moving mechanism 17 mounted on and supported by an X moving body 16 of the X-axis moving mechanism 15, and each partially supporting table 12 is mounted on and supported by a Y moving body 18 of the corresponding Y-axis moving mechanism 17.

Each of the partially supporting tables 12 has a partially supporting surface portion 19 for partially supporting the glass plate 2 at the same height as the central supporting table 9 and a stepped surface portion 21 which is 2 to 3 mm lower than the partially supporting surface portion 19. In the bend-breaking and separation of the edge portion 4, each of the partially supporting tables 12 supports a portion 22 at the cut line 3 on the glass plate 2 and the main body portion 24 in the vicinity of the cut line 3, and the stepped surface portion 21 is positioned immediately underneath the edge portion 4 to allow the bending of the glass plate 2 by the application of a pressing force against the edge portion 4 by a rotatable pressing roller 20 serving as a pressing body and the escape of the edge portion 4 to the stepped surface portion 21 side.

After the bend-breaking of the edge portion 4 from the main body portion 24 and after the transport of the main body portion 24 by the transporting device 45, the endless belt 6 is adapted to travel by means of a belt 72 and pulleys 73 and 74, around which the belt 72 is wound, by the operation of an electric motor 71 so as to discharge from the endless belt 6 the edge portion 4 serving as bend-breaking cullet remaining on the endless belt 6.

Each of the bend-breaking heads 5 is held above the supporting device 7 by each of a pair of moving devices 27 provided in each of a pair of spaces 26 with the central region 10 located therebetween.

Each of the moving devices 27 comprises an X-axis moving unit 29 mounted on the mount 28 and a Y-axis moving unit 31 mounted on an X moving body 30 of the X-axis moving unit 29, and each of the bend-breaking heads 5 is mounted on a Y moving body 32 of the corresponding Y-axis moving unit 31.

Each of the bend-breaking heads 5 includes a bracket 33 mounted on the Y moving body 32; a bearing unit 34 mounted on the bracket 33; a rotating shaft 36 which is rotatably held by the bearing unit 34 and has a rotational axis 35 perpendicular to the upper surface of the glass plate 2, i.e., a supporting surface of the partially supporting surface portion 19; an air cylinder unit 37 mounted at a lower end of the rotating shaft 36; the pressing roller 20 which is rotatably mounted at a lower end of a piston rod 38 of the air cylinder unit 37 on the rotational axis 35 of the rotating shaft 36; and an angle controller 39 for rotating the rotating shaft 36 under angular control by means of a transmitting means 42 such a pulley and a belt.

The piston rod 38 of the air cylinder unit 37 is adapted to be synchronously rotated by the rotation of the rotating shaft 36 about the rotational axis 35. As the air pressure to the air cylinder unit 37 is changed over, the pressing roller 20 is adapted to be synchronously moved upwardly and downwardly by the upward and downward movement of the piston rod 38 and to be brought into contact with and pressed against the upper surface of the glass plate 2 and moved away upwardly from the upper surface of the glass plate 2 by this upward and downward movement.

The angle controller 39 has an NC control motor 40 and a speed reducer 41 and is mounted on the bracket 33 at the speed reducer 41, and the rotating shaft 36, the air cylinder unit 37, and the pressing roller 20 are integrally rotated under angular control about the rotational axis 35 perpendicular to the upper surface of the glass plate 2 by the angle controller 39.

Figure 6:
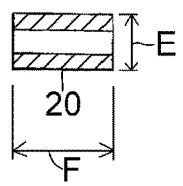
FIG. 6 is an explanatory cross-sectional view of a pressing roller in the embodiment shown in FIG. 1.
Figure 7:
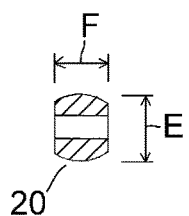
FIG. 7 is an explanatory cross-sectional view of another example of the pressing roller in the embodiment shown in FIG. 1.
Figure 8:
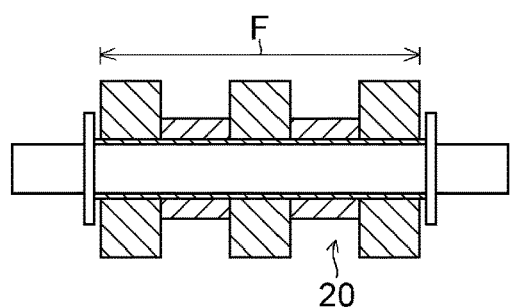
FIG. 8 is an explanatory view of still another example of the pressing roller in the embodiment shown in FIG. 1.

As shown in FIGS. 6 and 7, the pressing roller 20 which is molded from, for example, urethane resin may be constituted by a cylindrical body having a diameter E of 10 mm to 30 mm and a horizontal width F of not less than 10 mm, preferably from 50 mm to 60 mm or a spherical body having a diameter E of from 10 mm to 30 mm Still alternatively, as shown in FIG. 8, the pressing roller 20 may be one in which a plurality of cylindrical bodies or spherical bodies shown in FIGS. 6 and 7 are connected together with the width F of not less than 10 mm in an axial direction. By setting the diameter E of the pressing roller 20 to from 10 mm to 15 mm, it is possible to bend-break and separate a narrow edge portion 4 of from 4 mm to 5 mm more accurately.

In order to effect the carrying in of the glass plate 2 onto the supporting device 7 after the formation of the cut line and the carrying out of the main body portion 24 of the bend-broken glass plate 2 from the supporting device 7, the transporting device 45 provided above the central region 10 is provided with a moving body 46 which moves linearly in the X-axis direction, a vertically moving unit 47 which is mounted on the moving body 46 and is raised and lowered in the vertical direction, and a suction pad 48 provided at a lower end of the vertically moving unit 47 to effect the suction and release of suction of the glass plate 2.

During the bend-breaking operation of the glass plate 2, the suction pad 48 is lowered by the vertically moving unit 47, and presses and fixes the glass plate 2 immovably onto the central supporting table 9 through the endless belt 6.

Hereafter, a description will be given of the operation and a bend-breaking method by means of the bend-breaking apparatus 1A.

After the glass plate 2 is sucked by the suction pad 48 of the transporting device 45 and carried into the central region 10 by the moving body 46 of the transporting device 45, the glass plate 2 is pressed against the central supporting table 9 in the central region 10 by the suction pad 48, whereupon the partially supporting table 12 and the bend-breaking head 5 are moved to the predetermined bend-breaking position of the edge portion 4 and are opposed to each other with the glass plate 2 and the endless belt 6 located therebetween.

The partially supporting surface portion 19 located underneath the cut line 3 of the glass plate 2 supports the main body portion 24, while the stepped surface portion 21 located underneath the edge portion 4 of the glass plate 2 forms under the edge portion 4 an escape portion which allows the bending down of the edge portion 4.

Simultaneously as the pressing roller 20 is positioned above the edge portion 4, the pressing roller 20 is subjected to angular control about the rotational axis 35, and the orientation of its rolling direction is thereby adjusted to a normal direction C-C to the cut line 3 or a direction of traversing the edge portion 4 which is a direction oriented from the cut line 3 toward a peripheral edge 3b of the glass plate 2.

The pressing roller 20 is lowered in a posture in which the direction of rolling movement is adjusted to the normal direction C-C or the traversing direction and presses the edge portion 4, and the pressing roller 20 in this pressing state is rollingly moved in the normal direction C-C or the traversing direction.

Since the pressing roller 20 has a circular outer periphery and its rotational axis is in a state of being parallel to the cut line 3 or approximate thereto, the pressing roller 20 presses only the edge portion 4 by a circular contact surface of a lower end thereof. Further, since the pressing roller 20 rollingly moves in the normal direction C-C or the traversing direction, the pressing roller 20 imparts a sufficient bending load to the edge portion 4 and performs the bend-breaking and separation of the edge portion 4 accurately in conjunction with the escape portion below the edge portion 4.

Figure 9:
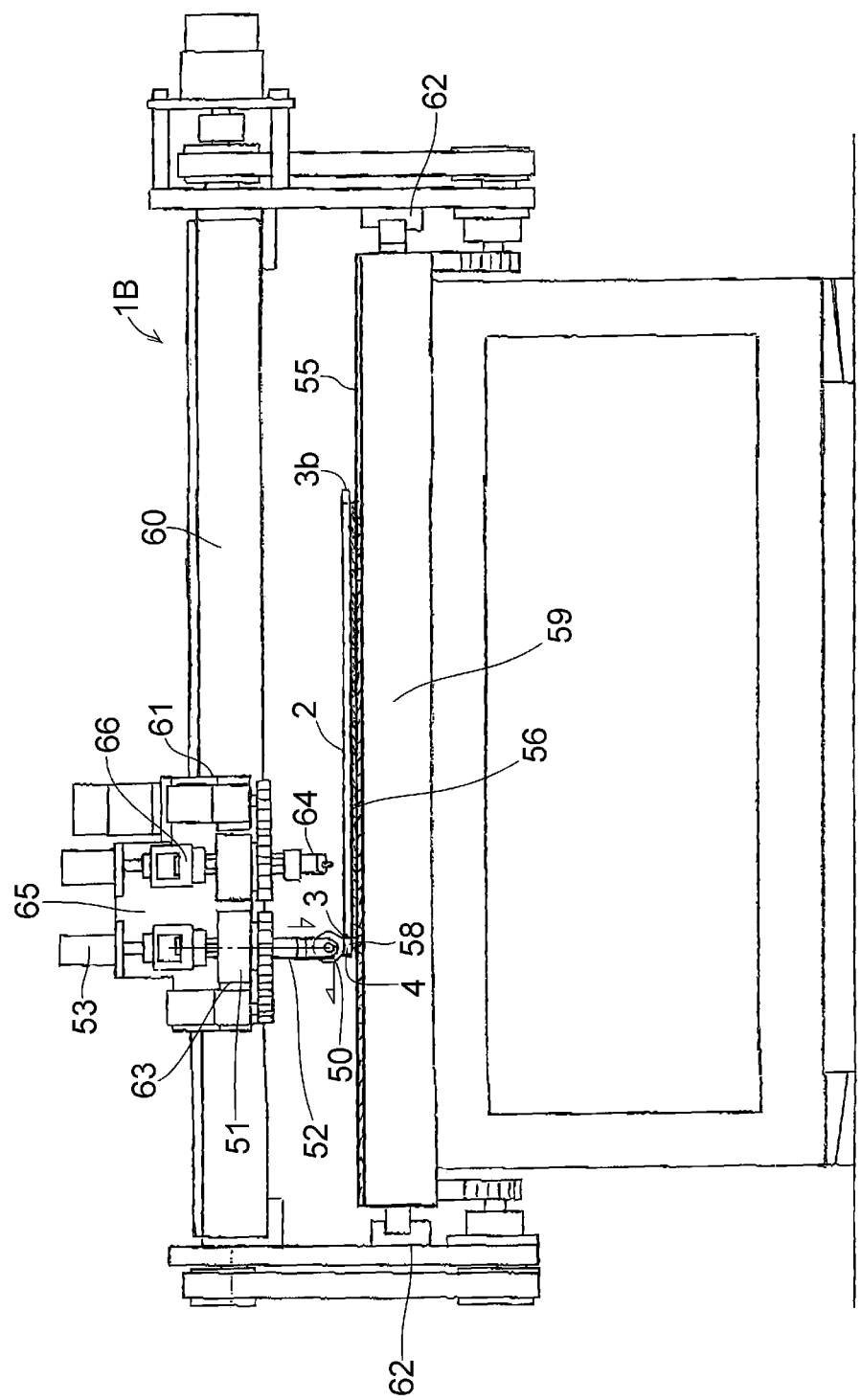
FIG. 9 is an explanatory front elevational view of a glass cutting apparatus in which a bend-breaking head is juxtaposed to a scribe head for cut line formation.

The movement of the partially supporting tables 12 and the bend-breaking heads 5 are moved by being subjected to NC control in an orthogonal X-Y planar coordinate system A glass plate cutting apparatus 1B with a bend-breaking apparatus shown in FIG. 9 is comprised of a supporting table 59; a pair of X-axis moving devices 62 respectively provided on both sides of the supporting table 59; a Y-axis moving device 60 mounted on the X-axis moving devices 62; and a common processing head 65 which is mounted on a moving body 61 of the Y-axis moving device 60 to effect orthogonal coordinate system movement over the planarly supported glass plate 2 in parallel with the upper surface of the glass plate 2. A cutting head 66 having a cutter wheel 64 and a bend-breaking head 63 are juxtaposed on the processing head 65.

In the glass plate cutting apparatus 1B, the cut line 3 is formed on the glass plate 2 by the cutter wheel 64 by operating the cutting head 66 in the first orthogonal coordinate system movement of the processing head 65 on the basis of NC processing information stored therein. Then, in the second orthogonal coordinate system movement, the bend-breaking of the edge portion 4 outside the cut line 3 is effected by operating the bend-breaking head 63.

The bend-breaking head 63 has a pressing roller 50, a spline shaft 52, an angle controller 51 for angularly controlling the spline shaft 52, and an air cylinder unit 53 for vertically moving the pressing roller 50.

The glass plate 2 is planarly supported on a sheet 55 on the upper surface of the supporting table 59 through a template 56 having a thickness of 2 mm to 3 mm.

The template 56 is formed in a shape and a size substantially identical to those of the cut line 3 and forms a space 58 underneath the edge portion 4 between the peripheral edge 3b of the glass plate 2 and the cut line 3, to thereby allow the edge portion 4 to escape during bend-breaking.

In the glass plate cutting apparatus 1B, the bend-breaking operation of the edge portion 4 by the bend-breaking head 63 is performed in the same way as the bend-breaking apparatus 1A.

Figure 10:
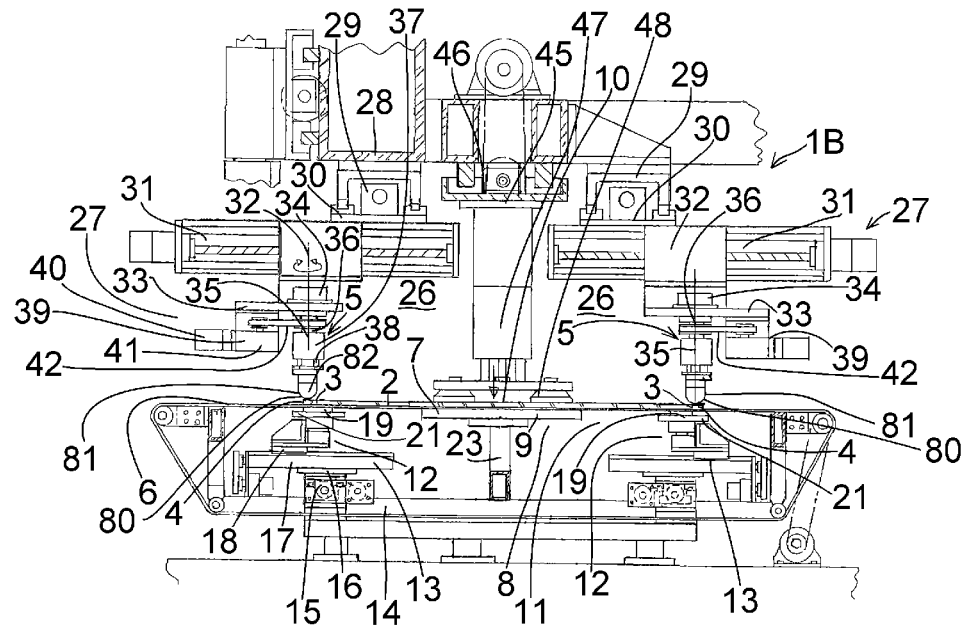
FIG. 10 is an explanatory view of another preferred embodiment of the present invention.

Incidentally, although the bend-breaking apparatus 1A is adapted to bend-break and separate the edge portion 4 from the main body portion 24 by using the rotatable pressing roller 20 as the pressing body and by rollingly moving the pressing roller 20 in the normal direction C-C or the traversing direction, an arrangement may alternatively be adopted as follows: As shown in FIG. 10, a pressing rod 81 which serves as a pressing body and whose distal end face (pressing face) 80 is cylindrically shaped is mounted at a lower end of the piston rod 38; in the application of a pressing force against the edge portion 4 by the pressing rod 81, the pressing rod 81 is subjected to angular control about the rotational axis 35 such that a center 82 of the cylindrical surface of the distal end face 80 extends in a direction perpendicular to the normal direction C-C or the direction of traversing the edge portion 4, and a bend-breaking force is applied to the edge portion 4 by the pressing rod 81 as the pressing rod 81 at the distal end face 80 presses and contacts the edge portion 4 by the lowering of the pressing rod 81 subsequent to the angular control; and, thereafter, in the same way as the bend-breaking apparatus 1A, the pressing rod 81 at the distal end face 80 is slidingly moved in the normal direction C-C or the direction of traversing the edge portion 4 while maintaining the pressing and contacting of the edge portion 4 by the pressing rod 81 at the distal end face 80, to thereby bend-break and separate the edge portion 4 from the main body portion 24.

The distal end face 80 of the pressing rod 81 may be spherically shaped instead of being cylindrically shaped as shown in FIG. 10, and in the case of the pressing rod 81 having the spherical distal end face 80, the angular control of the pressing rod 81 about the rotational axis 35 can be omitted.

Figure 11:
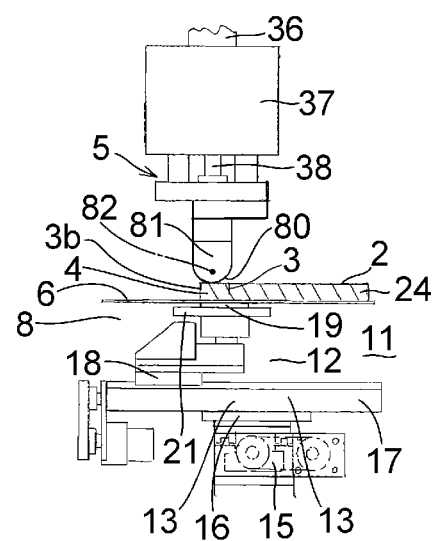
FIG. 11 is an explanatory view of the bend-breaking operation in the embodiment shown in FIG. 10.
Figure 12:
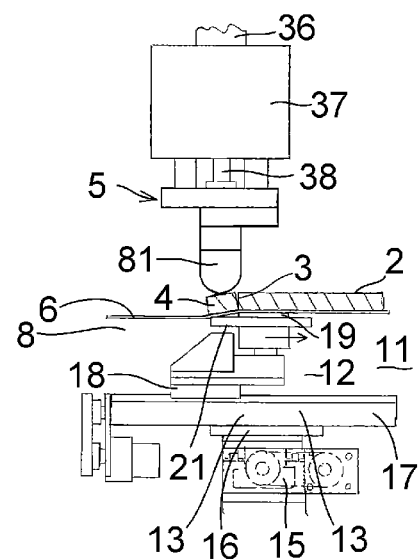
FIG. 12 is an explanatory view of the bend-breaking operation in the embodiment shown in FIG. 10.

In addition, although, in the above, the edge portion 4 is adapted to be bend-broken and separated from the main body portion 24 by moving the pressing roller 20 or the pressing rod 81 in the normal direction C-C or the direction of traversing the edge portion 4 and by forming in advance the escape portion under the edge portion 4 for allowing bending down of the edge portion 4, an arrangement may alternatively be adopted as follows: As shown in FIGS. 10 to 12, the partially supporting surface portion 19 is positioned in advance underneath the edge portion 4, and in this state the partially supporting surface portion 19 is moved beyond the cut line 3 in the normal direction C-C or the direction of traversing the edge portion 4, i.e., a direction oriented from the peripheral edge 3b toward the cut line 3 simultaneously with the pressing of the edge portion 4 by the distal end face 80 due to the lowering of the pressing rod 81 subsequent to the angular control, to thereby form an escape portion under the edge portion 4 for allowing the bending down of the edge portion 4. By the formation of this escape portion, the edge portion 4 may be bend-broken and separated from the main body portion 24 by the bend-breaking force applied to the edge portion 4 by the pressing rod 81.

Figure 13:
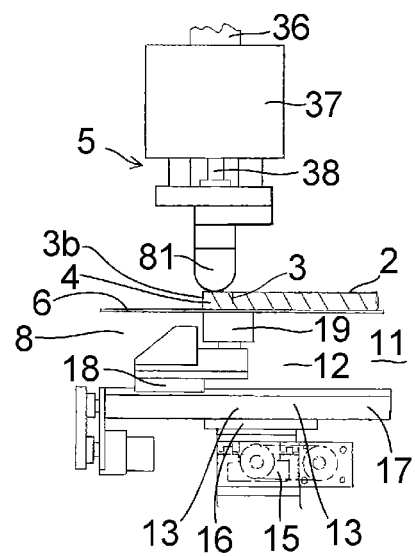
FIG. 13 is a partial explanatory view of still another preferred embodiment of the present invention.
Figure 14:
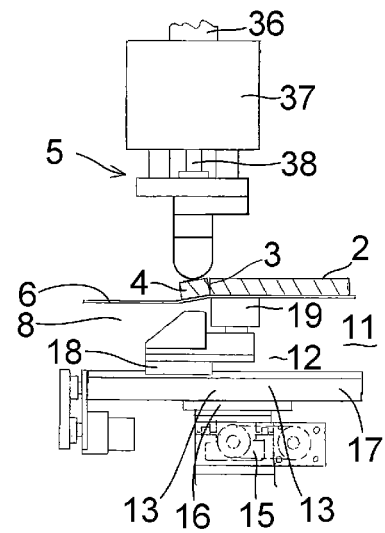
FIG. 14 is an explanatory view of the bend-breaking operation in the embodiment shown in FIG. 13.

Furthermore, although, in the above, each of the partially supporting tables 12 has the partially supporting surface portion 19 and the stepped surface portion 21, each of the partially supporting tables 12 may have the partially supporting surface portion 19, but may not have the stepped surface portion 21, as shown in FIGS. 13 and 14. In the partially supporting table 12 shown in FIGS. 13 and 14, the escape portion for allowing the bending down of the edge portion 4 is adapted to be formed around the partially supporting surface portion 19 itself underneath the edge portion 4 by the movement of the partially supporting surface portion 19 beyond the cut line 3 in the normal direction C-C or the direction of traversing the edge portion 4, i.e., the direction oriented from the peripheral edge 3b toward the cut line 3.

The partially supporting table 12 which is not provided with the stepped surface portion 21 can also be used in the bend-breaking apparatus 1A shown in FIGS. 1 to 5.

Figure 15:
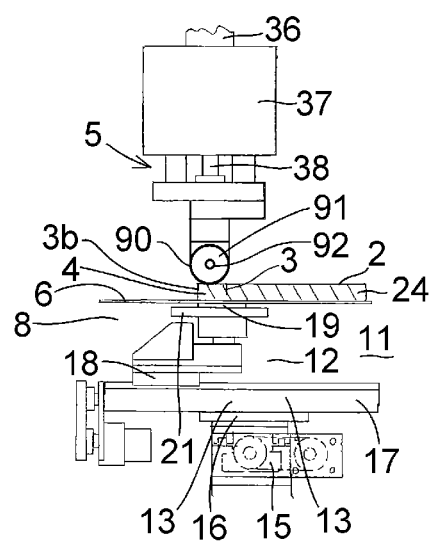
FIG. 15 is a partial explanatory view of a further preferred embodiment of the present invention.

As the pressing body, in substitution for the pressing rod 81 having the pressing roller 20 and the cylindrical or spherical distal end face 80, it is possible to use a pressing member 91 constituted by a columnar body or a cylindrical body having a diameter E of from 10 mm to 30 mm, preferably from 10 mm to 15 mm, and a width F of not less than 10 mm, preferably from 50 mm to 60 mm, as shown in FIG. 15. Such a pressing member 91 having a cylindrical surface 90 may be caused to effect an operation similar to the operation shown in FIGS. 10 to 12 or the operation shown in FIGS. 13 and 14, namely, the operation in which the partially supporting surface portion 19 is moved beyond the cut line 3 in the normal direction C-C or the direction of traversing the edge portion 4, i.e., the direction oriented from the peripheral edge 3b toward the cut line 3 simultaneously with the pressing of the edge portion 4 by the cylindrical surface 90 due to the lowering of the pressing member 91, to thereby form the escape portion under the edge portion 4 for allowing the bending down of the edge portion 4, whereby, by the formation of this escape portion, the edge portion 4 is bend-broken and separated from the main body portion 24 by the bend-breaking force applied to the edge portion 4 by the pressing member 91. Such a pressing member 91 constituted by a columnar body or a cylindrical body may not rotate, but may be adapted to rotate about a center 92 of the columnar body or the cylindrical body.

Furthermore, the pressing body may be mounted on the lower end of the piston rod 38 in an inclined manner so as to push out the edge portion 4 toward the peripheral edge 3b side in the bend-breaking of the edge portion 4.

DESCRIPTION OF REFERENCE NUMERALS

1A: bend-breaking apparatus
2: glass plate
3: cut line
4: edge portion
5: bend-breaking head
6: endless belt
7: supporting device
8: supporting table mechanism
9: central supporting table
12: partially supporting table
13: moving device
14: base
15: X-axis moving mechanism
16, 30: X moving body
17: Y-axis moving mechanism
18, 32: Y moving body
19: partially supporting surface portion
21: stepped surface portion
24: main body portion
27: moving device
28: mount
29: X-axis moving unit
31: Y-axis moving unit

The invention claimed is:

1. A method of bend-breaking a glass plate for bend-breaking and separating an edge portion by causing a pressing roller to partially press the edge portion located between a peripheral edge of the glass plate and a cut line formed on the glass plate, comprising:
adjusting a rolling direction of the pressing roller to be changed to a normal direction relative to the cut line at a predetermined bend-breaking position of the edge portion so that a line of contact between the pressing body and the glass plate becomes substantially parallel to the cut line,
causing the pressing roller to rotatingly move in the normal direction toward the peripheral edge of the glass plate while the edge portion is being pressed by the pressing roller, to thereby perform the bend-breaking and separation of the edge portion.

2. A method of bend-breaking a glass plate for bend-breaking and separating an edge portion by causing a pressing roller to partially press the edge portion located between a peripheral edge of the glass plate and a cut line formed on the glass plate, comprising:
adjusting a rolling direction of the pressing roller to a transverse direction relative to the edge portion from the cut line toward the peripheral edge of the glass plate so that a line of contact between the pressing body and the glass plate becomes substantially parallel to the cut line at a predetermined bend-breaking position of the edge portion,
causing the pressing roller to rotatingly move in the transverse direction while the edge portion is being pressed by the pressing roller, to thereby perform the bend-breaking and separation of the edge portion.

3. A method of bend-breaking a glass plate for bend-breaking and separating an edge portion by causing a horizontally elongated pressing body having a cylindrical surface to partially press the edge portion located between a peripheral edge of the glass plate and a cut line formed on the glass plate, comprising:
causing the pressing body to slidingly move at a predetermined bend-breaking position of the edge portion in a direction oriented from the cut line toward the peripheral edge of the glass plate while the edge portion is being pressed by the pressing body so that a line of contact between the horizontally elongated pressing body and the glass plate becomes substantially parallel to the cut line, to thereby perform the bend-breaking and separation of the edge portion.

4. A method of bend-breaking a glass plate, comprising:
causing a pressing body whose orientation of moving direction is adjusted to a normal direction to a cut line or a traversing direction from the cut line toward a peripheral edge of the glass plate so that a line of contact between the pressing body having a cylindrical surface and the glass plate becomes substantially parallel to the cut line to press an edge portion at a predetermined bend-breaking position of the edge portion located between the peripheral edge of the glass plate and the cut line formed on the glass plate, while causing a supporting body which supports from an opposite direction to a pressing direction of the pressing body the edge portion pressed by the pressing body to move in a direction oriented from the peripheral edge of the glass plate in the edge portion toward the cut line, to thereby perform the bend-breaking and separation of the edge portion.

5. A method of bend-breaking a glass plate, comprising:
causing a pressing body whose orientation of moving direction is adjusted to a normal direction to a cut line or a traversing direction from the cut line toward a peripheral edge of the glass plate so that a line of contact between the pressing body having a cylindrical surface and the glass plate becomes substantially parallel to the cut line to press an edge portion at a predetermined bend-breaking position of the edge portion located between the peripheral edge of the glass plate and the cut line formed on the glass plate, while causing a supporting body which supports from an opposite direction to a pressing direction of the pressing body the edge portion pressed by the pressing body to move beyond the cut line in a direction oriented from the peripheral edge of the glass plate in the edge portion toward the cut line, to thereby perform the bend-breaking and separation of the edge portion.

6. A glass plate bend-breaking apparatus comprising:
a pressing body having a cylindrical surface and configured to press a glass plate with a cut line formed thereon;
a supporting device configured to support the glass plate from an opposite direction to a pressing direction of the pressing body; and
a moving device configured to move one of the pressing body and the supporting device in a direction of traversing an edge portion of the glass plate located outside the cut line,
said pressing body being oriented in a normal direction relative to the cut line or a traversing direction from the cut line toward a peripheral edge of the glass plate so that a line of contact between the pressing body and the glass plate becomes substantially parallel to the cut line,
said glass plate bend-breaking apparatus being adapted to bend-break and separate the edge portion from a main body portion of the glass plate located inside the cut line by the movement of one of the pressing body and the horizontally movable partially supporting table by the moving device.

7. The glass plate bend-breaking apparatus of claim 6, wherein the pressing body has an axis of rotation that is parallel to the cut line as the pressing body traverses the edge portion of the glass plate.

* * * * *